Oct. 14, 1941.                J. E. O. FELLER                2,259,337
                                ICE CREAM SCOOP
                              Filed April 9, 1940

Inventor
John E. O. Feller
By Frease and Bishop
   Attorneys

Patented Oct. 14, 1941

2,259,337

UNITED STATES PATENT OFFICE 2,259,337

ICE CREAM SCOOP

John E. O. Feller, Canton, Ohio

Application April 9, 1940, Serial No. 328,715

7 Claims. (Cl. 107—48)

The invention relates to scoops for gathering a measured quantity of ice cream from a container, and more particularly to a scoop for gathering a quantity of ice cream in a cone shape and dispensing it into a conventional ice cream cone.

Prior ice cream scoops have been provided having a conical shape in a solid piece, but these must be forced into a body of ice cream so as to gather ice cream into the large end of the scoop, and it is not only difficult to completely fill such a scoop if the ice cream is frozen hard, but it is also very difficult to discharge the ice cream from the scoop because the entire inner surface thereof adheres to the ice cream contained therein.

It has been proposed to provide conical scoops which are separable axially into two parts for facilitating the dispensing of the ice cream contained therein, but with such scoops the difficulty of completely filling them with ice cream is present, and the ice cream tends to adhere to one end, and the ice cream tends to adhere to one half or the other when the parts are separated.

Accordingly, it is an object of the present invention to provide a conical ice cream scoop which is comparatively easy to completely fill with ice cream.

Another object is to provide a conical ice cream scoop which includes interfitting parts separable in such a way as to become quickly disengaged from the ice cream contained in the scoop.

A further object is to provide a conical ice cream scoop formed by at least three interfitting parts expansible relative to each other and adapted to gather ice cream sidewise into the scoop as the parts are brought together.

A still further object is to provide a simple and inexpensive scoop which accomplishes the foregoing objectives, and which is easy to operate and use.

These and other objects are accomplished by the improvements comprising the present invention which may be stated in general terms as including a conical scoop formed of at least three interfitting conical segments pivoted together for opening and closing movement, and a hand lever operatively connected to said segments for opening and closing the scoop, said segments being so arranged in open position as to gather ice cream sidewise into the scoop during their closing movement.

Referring to the drawing forming part hereof in which a preferred embodiment of the invention is illustrated by way of example Figure 1 is a side elevation of the improved scoop in closed position, part of the handle being broken away;

Similar numerals refer to similar parts throughout the several views of the drawing.

The improved ice cream scoop comprising the present invention preferably includes a handle 5 having a hand grip 6 on one end and a conical scoop segment 7 on the other end. The conical segment 7 may be integral with the handle 5 as shown, or it may be rigidly secured to the handle in a usual fashion.

Figure 2:
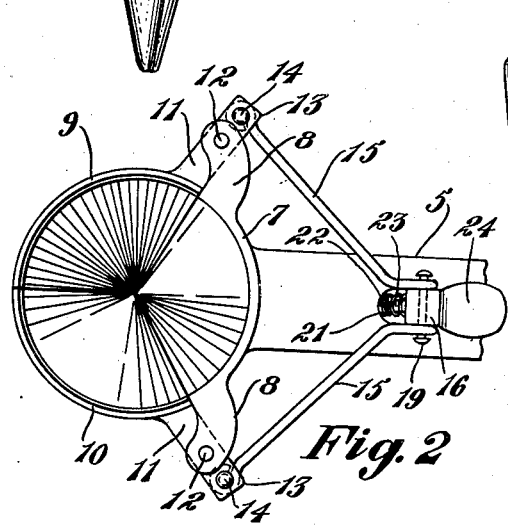
Fig. 2 is a fragmentary plan view thereof.

The fixed conical segment 7 forms one third of a conical scoop or container, and is provided at opposite sides with outwardly projecting ears 8 to which conical scoop segments 9 and 10 forming the other two thirds of the scoop are pivotally connected. The segments 9 and 10 each have a projecting lug 11 thereon which fits slidably between the upper and lower portions of the ears 8 and is pivotally connected thereto by means of a pivot pin 12 which is vertical or parallel to the axis of the cone. The segments 7, 9 and 10 are arranged to interfit when closed to form a complete conical container or scoop, as best shown in the closed position of Fig. 2, and the segments 9 and 10 are arranged to swing outwardly on their pivots 12 to the open position shown in Figs. 3 and 4.

The lugs 11 extend beyond the pivots 12 and their projecting ends 13 preferably have vertical pivot pins 14 therein on which angularly disposed link rods 15 are swiveled for actuating the segments 9 and 10 to swing them toward and away from the fixed segment 7.

The means for opening and closing the conical segments 9 and 10 preferably includes an operating lever 16 which may extend through a slot 17 in the handle 5 and which is pivoted intermediate its ends on a horizontal pivot pin 18 to the handle 5. The upper end of the lever 16 is provided with a horizontal pivot pin 19 on which the rear ends of the links 15 are swiveled, and the lower end of the lever 16 is rearwardly curved to provide a finger grip portion 20. Thus when the hand grip 6 is held by the user, pressure of the fingers on the portion 20 of the operating lever will force the upper end of the lever toward the conical segments and swing the segments 9 and 10 to the closed position shown in Fig. 2.

Means for yieldingly engaging the operating lever 16 to urge the segments toward open position preferably includes a helical spring 21 movably inserted in a socket 22 in the handle 5, and compressively engaging the operating lever 16 above the pivot 18, there being a spring centering stud 23 provided on the lever 16 for holding the spring in position. Accordingly, when pressure on the finger grip portion 20 of the lever is released, the spring tends to urge the upper end of the lever away from the segments toward the open position shown in Figs. 3 and 4.

Figure 4:
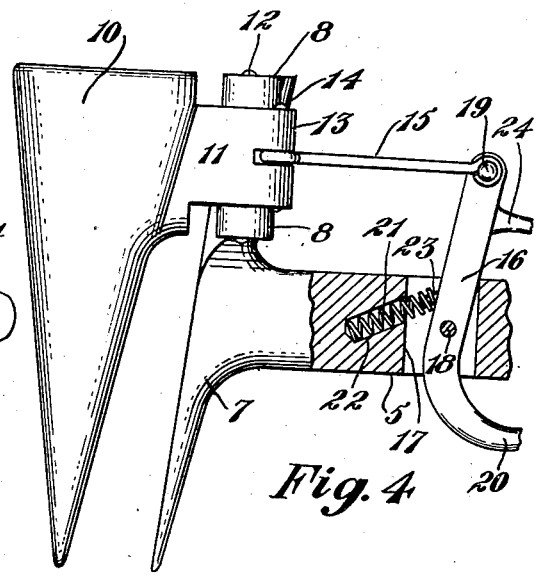
Fig. 4 is a fragmentary side view similar to Fig. 1, showing the scoop in open position.
Figure 3:
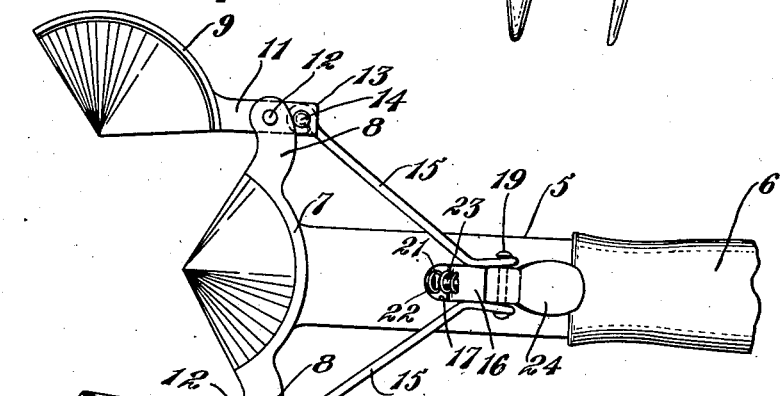
Fig. 3 is a fragmentary plan view showing the scoop in open position.

A thumb piece 24 is preferably provided on the rear side of the upper end of the operating lever so that if the force of the spring 21 is not sufficient to overcome the adhesion of the ice cream to the conical segments and open the same, a downward and rearward pressure can be applied to the upper end of the operating lever by the thumb of the user to move the segments to the open position of Figs. 3 and 4.

In the operation of the improved scoop it is held in the open position shown in Figs. 3 and 4 and forced into a body of ice cream in a direction longitudinally of the handle, to the left as viewed in Figs. 3 and 4, which direction is perpendicular to or sidewise of the axis of the conical scoop. When pressure is then applied to the portion 20 of the operating lever, the segments 9 and 10 swing inwardly with respect to segment 7 to interfit therewith in closed position, and during their closing movement the ice cream is gathered into the cone sidewise thereof, so that the cone is completely filled with ice cream by the exertion of considerably less force than would be required to fill a closed cone by gathering ice cream into the large end thereof.

Figure 1:
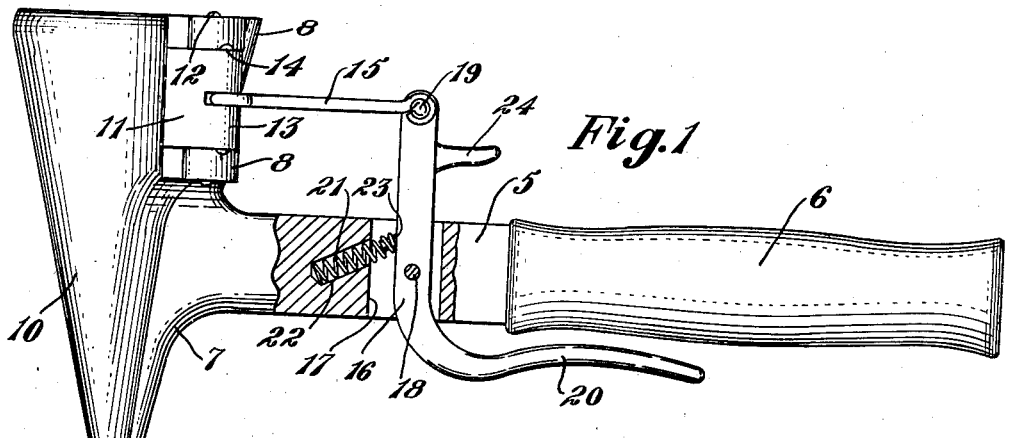

After the scoop has been thus filled with ice cream it is held in the position of Fig. 1 over an empty ice cream cone, and the pressure on the operating lever released, whereupon the spring 21 urges the segments to open position and the force of the spring can be supplemented by pressure on the thumb piece 24 if necessary to completely open the cone. The ice cream is easily disengaged and discharged from the scoop in open position because any one of the conical segments to which the ice cream may tend to adhere comprises only one third of the entire conical surface and such adherence is normally overcome by the weight of the ice cream itself.

The improved ice cream scoop provides a simple and inexpensive device which is easy to operate and use, and adapted for gathering a measured quantity of ice cream in a conical shape and dispensing the same into a conventional ice cream cone.

I claim:

1. An ice cream scoop including at least three conical segments each forming substantially one-third of a complete cone interfitting to form a hollow cone, a handle on one of said segments, means pivotally connecting each side of said one segment to one side of the other segments so that said other sections may swing outward upon said pivotal means, and means on said handle operatively connected to said other segments for opening and closing said cone.

2. An ice cream scoop including at least three segments interfitting to form a container, one of said segments having a handle thereon, means hingedly connecting one edge of each of the other segments to opposite sides of said one segment for opening and closing movement so that each of said other segments may swing outward upon its hinged connection away from said segment having the handle thereon, and means on said handle operatively connected to said other segments for swinging them inward and outward upon their hinged connections opening and closing the scoop.

3. An ice cream scoop including a handle having a conical segment thereon, two other conical segments pivotally mounted at adjacent sides on opposite sides of said first segment and adapted to interfit therewith to form a conical container, and a lever pivotally mounted on said handle and operatively connected to said two other conical segments to swing them upon the pivots for opening and closing the same.

4. An ice cream scoop including a handle having a conical segment thereon, two other conical segments pivotally mounted at adjacent sides on opposite sides of said first segment and adapted to interfit therewith to form a conical container, a lever pivotally mounted on said handle and operatively connected to said two other segments to swing them upon the pivots for opening and closing the same, and spring means engaging the lever for urging the segments toward open position.

5. An ice cream scoop including a handle having a conical segment thereon, two other conical segments pivotally mounted at adjacent sides on opposite sides of said first segment and adapted to interfit therewith to form a conical container, a lever pivotally mounted on said handle, link means operatively connecting said lever to said two other conical segments to swing them upon the pivots for opening and closing the same, and spring means on said handle yieldingly engaging said lever for urging said segments toward open position.

6. An ice cream scoop including three substantially equal conical segments interfitting to form a hollow cone, a handle on one of said segments, means hinging the other segments one to each side of said handle segment for swinging outwardly therefrom about pivots parallel with the axis of said cone, and means on said handle operatively connected to said other segments to swing them upon the pivots for opening and closing the same.

7. An ice cream scoop including three substantially equal conical segments interfitting to form a hollow cone, a handle on one of said segments, means hinging the other two segments one to each side of said handle segment for swinging outwardly therefrom about pivots parallel with the axis of said cone, a hand lever pivotally mounted on said handle, and links operatively connecting one end of said lever with each of said other two segments to swing them upon the pivots for opening and closing the same.

JOHN E. O. FELLER.